(12) United States Patent
Fiorese

(10) Patent No.: US 11,327,772 B2
(45) Date of Patent: May 10, 2022

(54) METHOD OF LOADING SOFTWARE CODE, CORRESPONDING SYSTEM AND VEHICLE EQUIPPED WITH SUCH A SYSTEM

(71) Applicant: STMicroelectronics S.r.l., Agrate Brianza (IT)

(72) Inventor: Davide Silvio Fiorese, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 419 days.

(21) Appl. No.: 16/422,469

(22) Filed: May 24, 2019

(65) Prior Publication Data

US 2019/0377584 A1   Dec. 12, 2019

(30) Foreign Application Priority Data

Jun. 6, 2018 (IT) .................... 102018000006081

(51) Int. Cl.
*G06F 9/4401* (2018.01)
*G06F 8/65* (2018.01)
*G06F 9/445* (2018.01)

(52) U.S. Cl.
CPC .............. *G06F 9/4408* (2013.01); *G06F 8/66* (2013.01); *G06F 9/445* (2013.01)

(58) Field of Classification Search
CPC ........... G06F 9/4408; G06F 8/66; G06F 9/445
See application file for complete search history.

(56) References Cited

U.S. PATENT DOCUMENTS

| | | | | |
|---|---|---|---|---|
| 7,299,347 B1 * | 11/2007 | Kao | ...................... | G06F 9/4401 709/220 |
| 8,386,759 B1 * | 2/2013 | Duwel | .................. | G06F 9/4401 713/2 |
| 8,789,036 B2 * | 7/2014 | Maini | ................. | G06F 9/44505 717/175 |
| 9,600,291 B1 * | 3/2017 | Atsatt | .................... | G06F 9/4401 |
| 2008/0028165 A1 * | 1/2008 | Sukegawa | ............. | G06F 13/102 711/154 |
| 2008/0201570 A1 * | 8/2008 | Reeves | ................. | G06F 15/177 713/2 |
| 2008/0209197 A1 * | 8/2008 | Hernandez | .............. | H04L 12/56 713/2 |
| 2010/0095106 A1 * | 4/2010 | Alexander | ............ | G06F 9/4408 713/2 |
| 2011/0004721 A1 * | 1/2011 | Smith | ..................... | G06F 21/51 711/103 |
| 2014/0075197 A1 * | 3/2014 | Alrabady | .............. | G06F 21/572 713/176 |

(Continued)

*Primary Examiner* — Aurel Prifti
(74) *Attorney, Agent, or Firm* — Slater Matsil, LLP

(57) ABSTRACT

A method for method of setting up a processing system includes determining availability of user-provided platform information indicative of a first memory platform out of a plurality of memory platforms. In response to determining that the user-provided platform information is available at the first memory platform, a boot loader code is read from the first memory platform. In response to determining that the user-provided platform information is not available, test availability of the boot loader code in another memory platform of the plurality of memory platforms, and read the boot loader code from the another memory platform upon testing the availability of the boot loader code in the another memory platform.

17 Claims, 2 Drawing Sheets

| OTP 4KBits | BITS | | | | | | | | | | | | | | | | | | | | | | | | | | | | | | | | CHUNK ID | CONTROL BITS FOR CHUNK |
|---|---|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | | |
| 127 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | special | special |
| 126 | | | | | | | | | | | | | | | | | | | | | | | | | | | | | | | | | | |
| 125 | | | | | | | | | | | | | | | | | | | | | | | | | | | | | | | | | | |
| 124 | SECURITY LEVEL+DUMMY BITS ( 2 bytes - 16 bits - REDUNDANCY) | | | | | | | | | | | | | | | | | | | | | | | | | | | | | | | | 13 | b27 or b26 |
| 123 | BOOT PARAMETERS ( 2 bytes - 16 bits - REDUNDANCY) | | | | | | | | | | | | | | | | | | | | | | | | | | | | | | | | | |
| 122 / 121 | SECURITY VERSION ( 4 bytes - 32 bits - REDUNDANCY) - Read and increased by the ROM | | | | | | | | | | | | | | | | | | | | | | | | | | | | | | | | | |
| 120 | CUSTOMER CERT REV ( 2 bytes - 16 bits - REDUNDANCY) - Read and increased by the ROM | | | | | | | | | | | | | | | | | | | | | | | | | | | | | | | | | |

(56) References Cited

U.S. PATENT DOCUMENTS

| | | | |
|---|---|---|---|
| 2014/0282815 A1* | 9/2014 | Cockrell | H04L 63/20 |
| | | | 726/1 |
| 2016/0077823 A1* | 3/2016 | Zhang | G06F 8/65 |
| | | | 717/171 |
| 2017/0308386 A1* | 10/2017 | Devitt-Carolan | G06F 9/4416 |
| 2019/0179629 A1* | 6/2019 | Roy | H04L 69/04 |

* cited by examiner

FIG. 3

| OTP 4Kbits | BITS 31 30 29 28 27 26 25 24 23 22 21 20 19 18 17 16 15 14 13 12 11 10 9 8 7 6 5 4 3 2 1 0 | CHUNK ID | CONTROL BITS FOR CHUNK |
|---|---|---|---|
| 127 | 1 1 0 0 0 0 0 0 0 0 0 0 0 0 0 0 0 0 0 0 0 0 0 0 0 0 0 0 0 0 0 0 | special | special |
| 126 | | | |
| 125 | | | |
| 124 | SECURITY LEVEL+DUMMY BITS ( 2 bytes - 16 bits - REDUNDANCY) | 13 | b27 or b26 |
| 123 | BOOT PARAMETERS ( 2 bytes - 16 bits - REDUNDANCY) | | |
| 122 | SECURITY VERSION ( 4 bytes - 32 bits - REDUNDANCY) - Read and increased by the ROM | | |
| 121 | | | |
| 120 | CUSTOMER CERT REV ( 2 bytes - 16 bits - REDUNDANCY) - Read and increased by the ROM | | |

FIG. 4

XLoader Layout

| | 0x0 | 0x1 | 0x2 | 0x3 | 0x4 | 0x5 | 0x6 | 0x7 | 0x8 | 0x9 | 0xA | 0xB | 0xC | 0xD | 0xE | 0xF |
|---|---|---|---|---|---|---|---|---|---|---|---|---|---|---|---|---|
| MBR Row 0x00 | 0xEB | 0x10 | 0x90 | XLoader Lengths (Bytes) | CID | RM | #DC | F | OPT | CTM_A | CDC_A | EVC_A | VC_A | SR2_A | SR1_A | CTM_L |
| Lengths Row 0x10 | Spare area 1 | | | | | | | | Spare area 2 | | | | Code Offset (Bytes) | | Header CRC | |
| Free Row 0x20 | A0 | A1 | A2 | A3 | A4 | A5 | A6 | A7 | A8 | A9 | AA | AB | AC | AD | AE | AF |
| CRCs Row 0x30 | WM | EVC_M | VC_M | SR_M | CTM | SR_R | SR_W | CDC | XLoader CRC | | | | Header CRC | | | |
| 0x40 | | | | | | | | | | | | | | | | |

Nor Page 0

METHOD OF LOADING SOFTWARE CODE, CORRESPONDING SYSTEM AND VEHICLE EQUIPPED WITH SUCH A SYSTEM

CROSS-REFERENCE TO RELATED APPLICATIONS

This application claims the benefit of Italian Patent Application No. 102018000006081, filed on Jun. 6, 2018, which application is hereby incorporated herein by reference.

TECHNICAL FIELD

The present invention relates generally to loading software code, and, in particular embodiments, to a method of loading software code, corresponding system and vehicle equipped with such a system.

BACKGROUND

Boot ROM with boot code may be associated with various modern processors (e.g. CPUs, microcontrollers, DSPs), e.g. by being integrated directly into their silicon.

The processor can thus perform a boot sequence by loading boot programs from various sources such as e.g. NAND/NOR flash storage, SD or MMC cards.

In certain contexts of use (the automotive sector being a case in point) loading boot software code should desirably meet various operating conditions.

For instance, a ROM should desirably load a first piece of software code—oftentimes referred to as xLoader—in a (very) short time to provide a time-to-X feature (e.g. time to first CAN message).

Also, a ROM should desirably be able to load a first piece of software code from any of a variety of supported non-volatile memory families (e.g. NAND/NOR flash storage, SD or MMC cards).

Briefly, a ROM should desirably be able to load a first piece of software code from virtually any device, in a short time and relying on adequate timings and functional configurations.

SUMMARY

One or more embodiments may be applied e.g. to systems of the SoC (System-on-Chip) type having associated embedded ROM (Read-Only Memory) code for smart bootloader loading.

Despite the extensive activity in the area, improved solutions are desirable that are capable of adequately providing such an ability. One or more embodiments contribute in providing such an improved solution.

One or more embodiments may relate to a method and a corresponding system and a corresponding vehicle (e.g. a motor vehicle) equipped with such a system.

The claims are an integral part of the technical teaching provided herein in respect of the embodiments.

One or more embodiments can facilitate fast, reliable and configurable software (SW) code loading from a variety of supported non-volatile memories.

One or more embodiments may involve introducing an xLoader header and/or using a user one-time-programmable (OTP) memory area to drive the boot flow.

An xLoader (which may be stored in a flash memory) may comprise a header plus a body, with the header adapted to contain parameters to make the loading process faster.

One or more embodiments may facilitate defining a ROM code which is smart and self-taught.

One or more embodiments may facilitate booting in a short time independently of the model/type of storage memory involved in the process.

One or more embodiments may take into account specific platform/storage device features in a defined domain.

One or more embodiments may avoid interactions with the external word in performing improved booting processes.

In one or more embodiments a fast boot is facilitated, compatible with storage device capabilities, in a wide variety of operating contexts, with increased processor flexibility.

The ST Telemaco3™ Premium Telematics and Connectivity Processor family and derivatives as well as the Accordo2™ family of devices available with the assignee of the instant application are exemplary of a possible area of application of embodiments.

Accordo2™ is a family of devices that provide a cost effective microprocessor solution for modern automotive car radio systems, with an embedded powerful Digital Sound Processing subsystem, as well as a MIPS efficient ARM Cortex-$R_4$ processor and an ARM Cortex-M3 controller dedicated for real-time CAN/Vehicle Interface Processing. Accordo2™ family devices come with a set of common interfaces (UART/I2S/I2C/USB/MMC) which facilitates implementing a feature-rich system as well as a cost effective solution, bundled with a software package, which facilitates fast system implementation.

BRIEF DESCRIPTION OF THE DRAWINGS

One or more embodiments will now be described, by way of example only, with reference to the annexed figures, wherein:

FIG. 3 is exemplary of a possible a user one-time-programmable (OTP) layout in embodiments, and FIG. 4 is exemplary of possible xLoader header management in embodiments.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
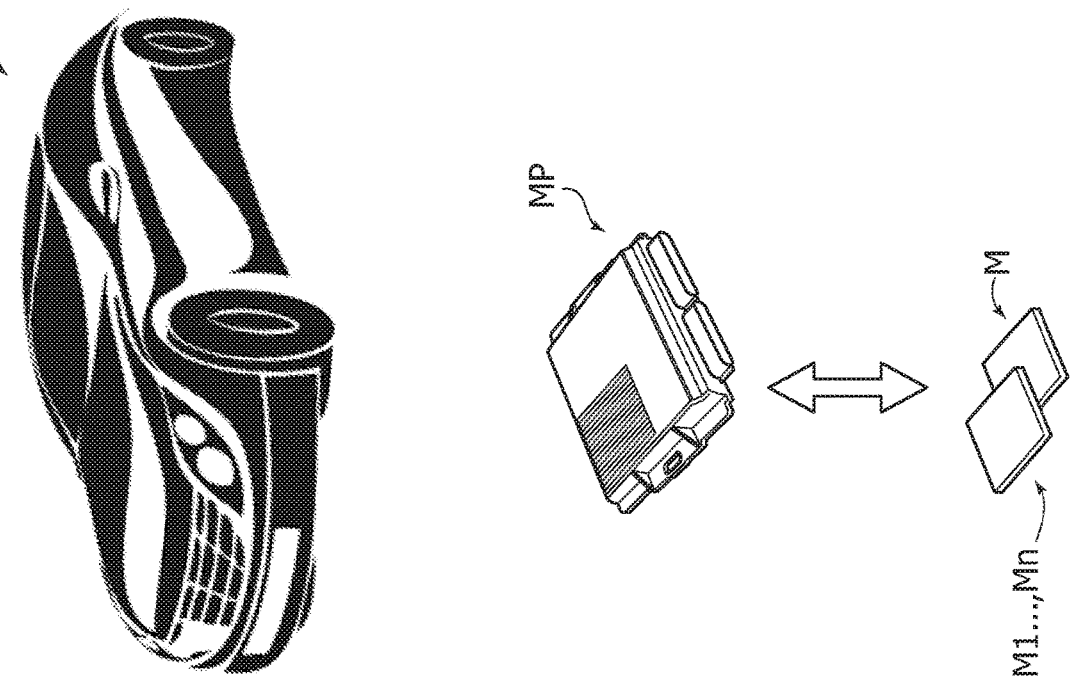
FIG. 1 depicts a possible context of use of embodiments.

FIG. 1 refers, by way of non-limiting example, to the possible application of embodiments in the automotive sector, e.g. in connection with (advanced) microprocessors MP having associated memories comprising a boot ROM, indicated M, plus a set of other memory sources M1, ... Mn (also referred to as platforms or peripherals) such as e.g. NAND/NOR flash storage, SD or MMC cards adapted to provide boot programs available for loading boot code to the processor MP under the coordination of SW code stored in the boot ROM M.

Secure microprocessors protecting "connected" motor vehicles C such as motor cars may be exemplary of such a context of use.

For instance, one System-on-Chip (SoC) may be used for telematics (or infotainment) high-level services and one companion chip, with a dedicated boot memory (e.g. ROM), may be used for CAN management.

In such arrangements, the Bill of Materials (BoM) may become fairly expensive: it may in fact comprise e.g. a main SoC with associated non-volatile memory (NVM) storage plus a CAN SoC again with associated non-volatile memory.

Such a platform may comprise other smart/early services (e.g. time to first rearview camera frame, time-to-first audio chime) rendered very rapid as a desirable feature.

Certain systems such as the ST Telemaco$_3$P SoC referred to in the foregoing may offer i.a. a dedicated application CAN subsystem. The capability of loading and setting up a CAN stack in a short time (for instance less than 60 ms), independently of the type(s) of main storage memory involved is a desirable feature for such a system, making it possible for the application layer running on the subsystem to take care of other smart/early services.

As already noted, in such a context, a ROM should desirably load a first piece of software code—oftentimes referred to as xLoader—in a (very) short time to provide a time-to-X feature (e.g. time to first CAN message).

Also, a ROM should desirably be able to load a first piece of software code from any of a variety of types of supported non volatile memory families or platforms (NAND, NOR, SD, MMC).

Briefly, a (boot) ROM should desirably be able to load a first piece of software code from virtually any device, in a short time and relying on adequate timings and functional configurations, possibly by interacting, e.g., with any of: a controller area network (CAN) vehicle bus protocol; a non-volatile flash memory using floating-gate transistors in a way that resembles a NAND gate; a non-volatile flash memory using floating-gate transistors in a way that resembles a NOR gate; a memory card for solid-state storage e.g. based on a NAND device plus an embedded controller (SD/MMC).

The various non-volatile memory (NVM) storage options discussed above are exemplary of various memory devices or platforms (M1, . . . , Mn, as exemplified in FIG. 1) adapted to provide pieces of software code to be loaded into the system in compliance with boot code stored in the boot ROM indicated M.

Notionally, a number of approaches can be envisaged in order to address the issues related to such a booting procedure.

For instance, one may create a list of supported NVM models/types, which however may not match customer expectations.

Also, one may elect to read the SW code in a slower and more basic way from a certain supported memory model and/or perform the loading process by subsequent attempts.

In addition to possibly causing an undesirable waste of time, these solutions may turn out to be unsatisfactory insofar as a desired result may be reached (only) for few storage devices, which may be expensive.

Figure 2:
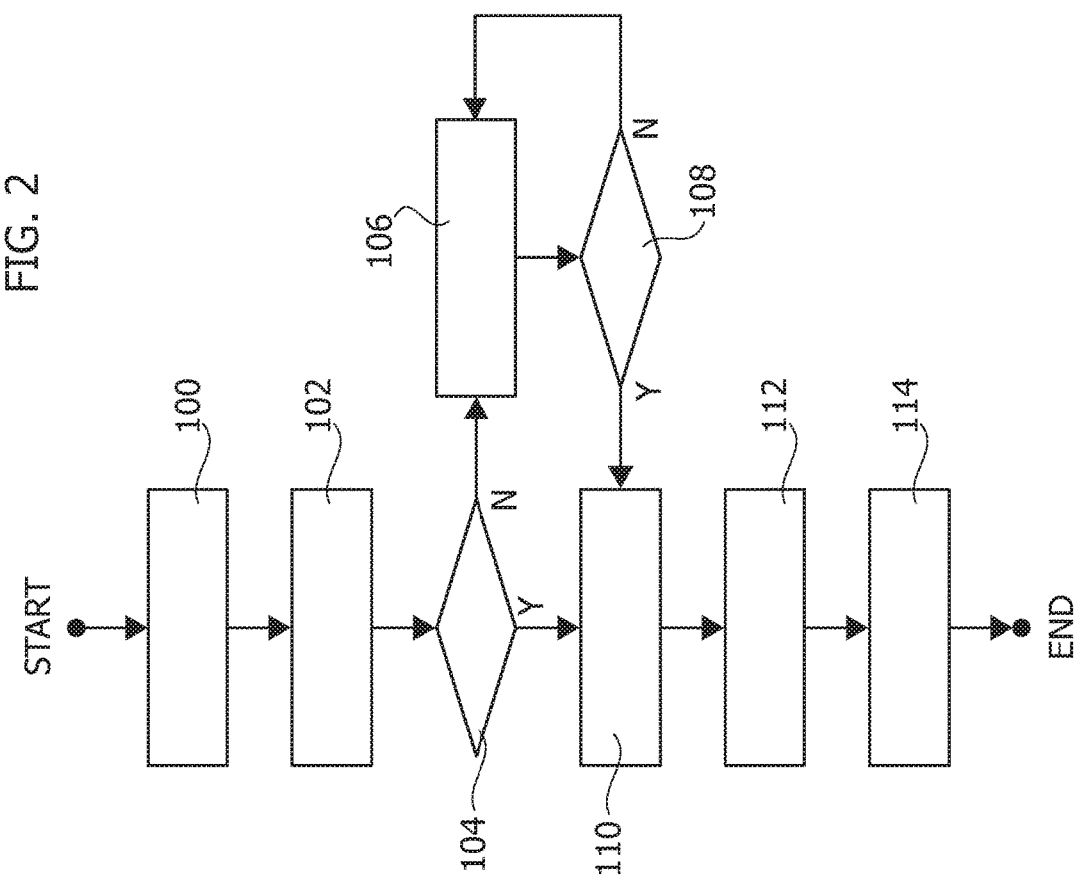
FIG. 2 is a flow chart exemplary of possible operation of embodiments.

In one or more embodiments, possible operation of a system (e.g. a SoC in a secure microprocessor MP protecting a "connected" car C) comprising, e.g. a boot ROM M and various (different) memory platforms (sources) M1, . . . , Mn may be as exemplified in the flow chart of FIG. 2.

After START, in an act (step) represented by block 100, the ROM starts setting up the system core.

In an act represented by block 102, the ROM reads platform information (more precisely, the ROM code facilitates an attempt to read such information) e.g. from an OTP area which can be written (e.g. "fused") by the customer/user.

Such platform information (if present) may be indicative of a (first) memory device out of the memory devices (platforms) M1, . . . , Mn from which boot loader code as desired can be read.

In one or more embodiments, such platform information may include e.g. information on the components in the system MP (e.g. a main SoC plus a CAN SoC with associated NVM storage) as well as information on desirable operation features e.g. smart/early services such as first rearview camera frame, time-to-first audio chime, and so on.

In an act represented by block 104, a check is made as to the actual availability of such OTP information which may be provided by the customer, including e.g. an indication of a preferred booting peripheral.

If the check at 104 yields a negative outcome (N), e.g. because the OTP area is empty, with no such information available therein, in an act represented by block 106, a hardcoded (default) sequence of memory platforms (out of M1, . . . , Mn), e.g. NAND first, SDMMC slot 0, SDMMC slot 1, etc. is attempted until a memory platform is located from which boot loader code as desired can be read. Success of such an action is represented by a positive outcome (Y) of block 108.

In one or more embodiments, several (different) default sequences may be hardcoded in the ROM M.

In one or more embodiments a certain sequence can be selected as a function on the status of two or three general purpose input/output pins, which status can be controlled by the user.

In one or more embodiments, whenever the act represented by block 108 yields a negative outcome (N), the act represented by block 106 is attempted again with a next boot platform (peripheral) belonging to a selected hardcoded sequence, looking for a valid piece of SW to be loaded.

In one or more embodiments, such attempts may be repeated with different boot platforms belonging to a selected hardcoded sequence and, possibly, by exploring a plurality such default sequences until the act represented by block 108 yields a positive outcome (Y=success).

As a result of a positive outcome (Y=success) in the act represented by block 108 in FIG. 2, in an act represented by the block 110—which may also be reached from the act 104 in the case of a positive outcome (Y) of the act 104—an xLoader header is read.

In one or more embodiments "optimizing" settings like device timings, fast read features, specific commands and parameters to activate high performance profiles can be extracted from the xLoader header and validated in an act represented by block 112.

In an act represented by block 114 the xLoader body is read after which END of the procedure exemplified in FIG. 2 occurs.

In case the act 114 occurs without optimizing parameters are applied, the xLoader body, which represents the largest portion of code to be loaded, will be loaded by relying on a basic standard configuration, exceeding the time-to-X feature.

If the check at 104 yields a positive outcome (Y) the ROM code may "read" from the user OTP, besides the boot platform identified (e.g. one of M1, . . . , Mn), specific settings from the user OTP in order to identify how to facilitate operation as best suited with a specific platform (e.g. NOR devices, 4-wire mode, high-speed, general purpose input/output—GPIO configuration), e.g. with "useless" configurations (e.g low-speed mode which is not preliminary to time-to-X feature) not taken into account.

In that case, hardcoded sequences are bypassed (going from block 102 to block 110 in FIG. 1 directly through the block 104), the preferred boot source peripheral is immediately identified and configured in the best way to exhaustively satisfy the time-to-X feature, relying on best specificities for the platform which hosts the MP.

In one or more embodiments, the ROM code can read the xLoader header in a standard way, e.g. a chunk of $6_4$ bytes at the top of the xLoader containing, in addition to certain integrity information, (all the) specific settings to configure the storage device in an effective way.

Device-dependent settings can be stored in the header and authenticated before usage.

In one or more embodiments, the ROM code can deploy the configuration on a standard configuration template, e.g., so that unauthorized operations are not allowed.

In one or more embodiments, specific boot source commands and parameters or configurations which could lead to a corruption of the loading process may be left out of consideration.

In one or more embodiments, the ROM code may read the xLoader body and certificates, which facilitates reading (almost) the entire xLoader body in an "optimizing" way.

In one or more embodiments, the xLoader header—e.g., 64 bytes—will be the only entity read in slow mode, while the body and appended meta-information are transferred always in the best and optimizing way depending on the context specificities.

FIG. 3 is an example of a possible user OTP layout in one or more embodiments, with exemplary choices for SD/MMC (memory card for solid-state storage based on a NAND device plus an embedded controller) boot source comprising: Boot v. User partition (SD card v. eMMC—embedded MultiMediaCard); Bus width (1-4-8 bit); Speed (low speed vs. high speed); and GPIO configuration.

FIG. 4 is exemplary of a possible approach in xLoader header management.

The following designations may apply.

CID: Command ID. The ID of the command to be used for reading the serial memory in fast mode. This completely defines the type of configuration the memory will use.

RM: Read Mode (SPI-qSPI-QPI)
[1]: SPI mode is used [1-1-1]
[2]: QPI mode is used [4-4-4]
[3]: qSPI mode 1 is used [1-4-4]
[4]: qSPI mode 2 is used [1-1-4]

DC: Number of Dummy Cycles to be programmed for reading in fast mode

F: frequency divisor to be applied to the serial NOR controller

OPT: option set #1
[7] Write status register before fast read phase
[4] Write VCFGR register before fast read phase
[3] Write EVCFGR register before fast read phase
[4] Issue set dummy cycle command before fast read phase
[3] Issue a custom command before fast read phase
[2] Enable feedback clock, for high speed performances
[1] Status register mask polarity to be checked afte reading the status register
[0] Spare bit CTM_A: custom command argument
CDC_A: set dummy cycles command argument
EVC_A: enhanced volatile configuration register argument
VC_A: volatile configuration register argument
SR2_A: status register command argument #2
SR1_A: status register command argument #1
CTM_1: custom command argument length (0 or 1)
WM: write mode
[1:0] enhanced volatile configuration register write mode
[3:2] volatile configuration register write mode
[5:4] status register write mode
[7:6] custom command write mode
EVC_M: enhanced volatile configuration register mask
VC_M: volatile configuration register mask
SR_M: status register mask
CTM: custom command ID
SR_R: read status register command ID
SR_W: write status register command ID
CDC: dummy cycle set command ID
xLoader CRC: cyclical redundancy code of xLoader
Header CRC: cyclical redundancy code of Header.

In one or more embodiments, a method of setting up a processing system (e.g., MP) by loading thereto boot loader code read (e.g. under the control of a boot ROM, M) from a memory platform out of a plurality of memory platforms (e.g., M1, . . . , Mn) may comprise: checking (e.g., 104) the availability of user-provided platform information (e.g., 102) indicative of a first memory platform, out of said plurality of memory platforms, adapted to provide said boot loader code; if said checking yields a positive outcome, reading (e.g., 110, 112, 114) said boot loader code from said first memory platform out of said plurality of memory platforms); if said checking yields a negative outcome, testing (e.g., 106, 108) for availability of said boot loader code at least another memory platform out of said plurality of memory platforms and reading said boot loader code from said at least another memory platform out of a plurality of memory platforms.

In one or more embodiments, said boot loader code may comprise a boot loader header and a boot loader body, wherein reading said boot loader code may comprise: reading (e.g., no) said boot loader header, extracting (e.g., 112) processing system settings therefrom, and reading (e.g. 114) the loader body.

In one or more embodiments, said boot loader code may comprise a boot loader header and a boot loader body, wherein reading said boot loader code may comprise reading the boot loader header in a first reading mode and the boot loader body in a second reading mode, the first reading mode slower than the second reading mode.

One or more embodiments may comprise reading said platform information from a one-time-programmable, OTP memory area.

One or more embodiments may comprise testing for availability of said boot loader code at least another memory platform out of said plurality of memory platforms in at least one hardcoded sequence of memory platforms.

One or more embodiments may comprise selecting said at least one hardcoded sequence of boot memory platforms out of a plurality of hardcoded sequences as a function of user controlled input.

One or more embodiments may comprise storing said boot loader code in a flash memory.

A processing system (e.g. MP) according to one or more embodiments may comprise ROM memory (e.g. M) having stored therein software code portions for implementing the steps of the method of one or more embodiments.

One or more embodiments may comprise a vehicle (e.g. V) equipped with a processing system according to one or more embodiments.

Without prejudice to the underlying principles, the details and embodiments may vary, even significantly, with respect to what has been described by way of example only, without departing from the extent of protection.

The extent of protection is defined by the annexed claims.

What is claimed is:

1. A method of setting up a processing system, the method comprising:
   determining availability of platform information indicative of a first memory platform out of a plurality of memory platforms;
   in response to determining that the platform information is available at the first memory platform, reading a boot loader code from the first memory platform; and
   in response to determining that the platform information is not available, testing whether the boot loader code is available from another memory platform of the plurality of memory platforms, and reading the boot loader code from the another memory platform upon testing the availability of the boot loader code in the another memory platform, wherein the boot loader code comprises a boot loader header and a boot loader body, wherein reading the boot loader code comprises reading the boot loader header, extracting processing system settings from the boot loader header, and reading the boot loader body.

2. The method of claim 1, further comprising reading the platform information from a one-time-programmable (OTP) memory area.

3. The method of claim 1, further comprising testing whether a memory platform in a hardcoded sequence of the plurality of memory platforms comprises the boot loader code.

4. The method of claim 3, further comprising selecting the hardcoded sequence of the plurality of memory platforms out of a plurality of hardcoded sequences as a function of user controlled input.

5. The method of claim 1, further comprising storing the boot loader code in a flash memory.

6. A method of setting up a processing system, the method comprising:
   determining availability of platform information indicative of a first memory platform out of a plurality of memory platforms;
   in response to determining that the platform information is available at the first memory platform, reading a boot loader code from the first memory platform; and
   in response to determining that the platform information is not available, testing whether the boot loader code is available from another memory platform of the plurality of memory platforms, and reading the boot loader code from the another memory platform upon testing the availability of the boot loader code in the another memory platform, wherein the boot loader code comprises a boot loader header and a boot loader body, wherein reading the boot loader code comprises reading the boot loader header in a first reading mode and the boot loader body in a second reading mode, the first reading mode being slower than the second reading mode.

7. A processing system comprising:
   read only memory storing a software code;
   a processor to execute the software code, the software code comprising instructions that when executed cause the processor to:
     determine availability of platform information indicative of a first memory platform out of a plurality of memory platforms;
     in response to determining that the platform information is available at the first memory platform, read a boot loader code from the first memory platform; and
     in response to determining that the platform information is not available, test whether of the boot loader code is available from another memory platform of the plurality of memory platforms and read the boot loader code from the another memory platform upon testing the availability of the boot loader code in the another memory platform, wherein the boot loader code comprises a boot loader header and a boot loader body, wherein the software code comprises instructions for reading the boot loader code that cause the processor to read the boot loader header, extract processing system settings from the boot loader header, and read the boot loader body.

8. The system of claim 7, wherein the software code comprises further instructions for reading the platform information from a one-time-programmable (OTP) memory area.

9. The system of claim 7, wherein the software code comprises further instructions for testing for availability of the boot loader code in a hardcoded sequence of the plurality of memory platforms.

10. The system of claim 9, wherein the software code comprises further instructions for selecting the hardcoded sequence of the plurality of memory platforms out of a plurality of hardcoded sequences as a function of user controlled input.

11. The system of claim 7, wherein the software code comprises further instructions for storing the boot loader code in a flash memory.

12. A processing system comprising:
    read only memory storing a software code;
    a processor to execute the software code, the software code comprising instructions that when executed cause the processor to:
      determine availability of platform information indicative of a first memory platform out of a plurality of memory platforms;
      in response to determining that the platform information is available at the first memory platform, read a boot loader code from the first memory platform; and
      in response to determining that the platform information is not available, test whether of the boot loader code is available from another memory platform of the plurality of memory platforms and read the boot loader code from the another memory platform upon testing the availability of the boot loader code in the another memory platform, wherein the boot loader code comprises a boot loader header and a boot loader body, wherein the software code comprises instructions for reading the boot loader code that cause the processor to read the boot loader header in a first reading mode and the boot loader body in a second reading mode, the first reading mode being slower than the second reading mode.

13. A vehicle comprising:
read only memory storing a software code;
a processor to execute the software code, the software code comprising instructions that when executed cause the processor to:
  determine availability of platform information indicative of a first memory platform out of a plurality of memory platforms;
  in response to determining that the platform information is available at the first memory platform, read a boot loader code from the first memory platform; and
  in response to determining that the platform information is not available, test whether of the boot loader code is available from another memory platform of the plurality of memory platforms and read the boot loader code from the another memory platform upon testing the availability of the boot loader code in the another memory platform, wherein the boot loader code comprises a boot loader header and a boot loader body, wherein the software code comprises instructions for reading the boot loader code that cause the processor to read the boot loader header, extract processing system settings from the boot loader header, and read the boot loader body.

14. The vehicle of claim 13, wherein the boot loader code comprises a boot loader header and a boot loader body, wherein the software code comprises instructions for reading the boot loader code that cause the processor to read the boot loader header in a first reading mode and the boot loader body in a second reading mode, the first reading mode being slower than the second reading mode.

15. The vehicle of claim 13, wherein the software code comprises further instructions for reading the platform information from a one-time-programmable (OTP) memory area.

16. The vehicle of claim 13, wherein the software code comprises further instructions for testing for availability of the boot loader code in a hardcoded sequence of the plurality of memory platforms.

17. The vehicle of claim 16, wherein the software code comprises further instructions for selecting the hardcoded sequence of the plurality of memory platforms out of a plurality of hardcoded sequences as a function of user controlled input.

* * * * *